United States Patent
Pereyra et al.

(10) Patent No.: US 9,414,622 B2
(45) Date of Patent: Aug. 16, 2016

(54) STABILIZER SYSTEM FOR A READY-TO-DRINK WHOLE GRAIN BEVERAGE

(75) Inventors: Ricardo Pereyra, White Plains, NY (US); William Mutilangi, Peekshill, NY (US)

(73) Assignee: PepsiCo, Inc., Purchase, NY (US)

( * ) Notice: Subject to any disclaimer, the term of this patent is extended or adjusted under 35 U.S.C. 154(b) by 130 days.

(21) Appl. No.: 13/179,187

(22) Filed: Jul. 8, 2011

(65) Prior Publication Data

US 2012/0058239 A1    Mar. 8, 2012

Related U.S. Application Data

(60) Provisional application No. 61/362,599, filed on Jul. 8, 2010.

(51) Int. Cl.
| | |
|---|---|
| *A23L 2/00* | (2006.01) |
| *A23L 2/02* | (2006.01) |
| *A23L 2/52* | (2006.01) |
| *A23C 9/152* | (2006.01) |
| *A23C 9/154* | (2006.01) |
| *A23L 1/0534* | (2006.01) |
| *A23L 1/054* | (2006.01) |
| *A23L 1/10* | (2006.01) |
| *A23L 2/62* | (2006.01) |

(52) U.S. Cl.
CPC . *A23L 2/52* (2013.01); *A23C 9/152* (2013.01); *A23C 9/1544* (2013.01); *A23L 1/0534* (2013.01); *A23L 1/0541* (2013.01); *A23L 1/0545* (2013.01); *A23L 1/10* (2013.01); *A23L 2/02* (2013.01); *A23L 2/62* (2013.01); *A23V 2002/00* (2013.01)

(58) Field of Classification Search
USPC .......................................... 426/321, 590, 654
See application file for complete search history.

(56) References Cited

U.S. PATENT DOCUMENTS

| | | | |
|---|---|---|---|
| 5,376,396 A | 12/1994 | Clark | |
| 5,407,694 A * | 4/1995 | Devine et al. | 426/565 |
| 5,641,532 A | 6/1997 | Pflaumer | |
| 5,654,027 A | 8/1997 | Chalupa | |
| 5,792,502 A | 8/1998 | Montezinos | |
| 6,171,633 B1 | 1/2001 | Dulebohn | |
| 6,808,726 B2 | 10/2004 | Hojo | |
| 7,396,552 B2 | 7/2008 | Ogasawara | |
| 2002/0102220 A1 * | 8/2002 | Stephenson | 424/49 |
| 2005/0074535 A1 | 4/2005 | Dulebohn | |
| 2005/0136170 A1 | 6/2005 | Grebenkamper | |
| 2005/0233046 A1 | 10/2005 | Krawczyk | |
| 2007/0014892 A1 | 1/2007 | Mitchell | |
| 2007/0026125 A1 | 2/2007 | Yuan | |
| 2007/0148321 A1 | 6/2007 | Ashida | |
| 2007/0196539 A1 | 8/2007 | Yang | |
| 2008/0008814 A1 | 1/2008 | Jackson | |
| 2008/0095901 A1 * | 4/2008 | Boerboom et al. | 426/271 |
| 2008/0160142 A1 | 7/2008 | Khulusi | |
| 2008/0260908 A1 | 10/2008 | Mutilangi | |
| 2008/0280007 A1 | 11/2008 | Van Dijk | |
| 2008/0286433 A1 | 11/2008 | Simpson | |
| 2009/0022853 A1 | 1/2009 | Ten Brink | |
| 2009/0311376 A1 | 12/2009 | Rao | |

FOREIGN PATENT DOCUMENTS

| | | |
|---|---|---|
| CN | 1830325 | 9/2006 |
| CN | 101401662 | 4/2009 |
| CN | 101632481 * | 1/2010 |
| CN | 101849672 | 10/2010 |
| CN | 101961084 | 2/2011 |
| CN | 101991166 | 3/2011 |
| EP | 1048690 | 11/2000 |
| EP | 2002726 | 12/2008 |
| JP | S60221067 A | 11/1985 |
| JP | 2004187663 A | 7/2004 |
| JP | 2009261393 | 11/2009 |
| WO | 2008144259 | 11/2008 |

OTHER PUBLICATIONS

Fennema et al, Food Chemistry 4th Edition pp. 115, 119, 137, 140, 141, and 147, CRC Press 2008.*

Igoe et al Dictionary of Food Ingredients 3rd Edition Chapman and Hall 1996, p. 122.*

Written Opinion and International Search Report for PCT/US2011/041947 mailed Feb. 15, 2012, pp. 1-11.

Japanese Patent Application No. 2013518516 Office Action mailed Jun. 24, 2014, pp. 1-7.

Chinese Patent Application No. 201180038954.6 Office Action mailed Jul. 4, 2014, pp. 1-19.

Chinese Application No. 201180038954.6 Office Action mailed Mar. 5, 2014, pp. 1-19.

Canadian Application No. 2804653 Office Action mailed Jan. 24, 2014, pp. 1-2.

AU Patent Application No. 2011276628 Office Action issued Jun. 25, 2013, pp. 1-3.

CN Application No. 201180038954.6 Office Action mailed Aug. 22, 2013, pp. 1-10.

RU Application No. 2013105273 Office Action mailed Dec. 23, 2013, pp. 1-7.

(Continued)

*Primary Examiner* — Kelly Bekker

(74) *Attorney, Agent, or Firm* — Sterne, Kessler, Goldstein & Fox P.L.L.C.

(57) ABSTRACT

A stabilizer system for use in a whole grain beverage containing carboxymethylcellulose (CMC), xanthan gum and gellan gum. In one aspect of the present invention, the stabilizer system includes about 5 to 20% gellan gum, about 1 to 10% xanthan gum, and about 50 to 90% CMC. The stabilizer system may be used in milk-based or juice-based whole grain beverages.

10 Claims, No Drawings

(56) References Cited

OTHER PUBLICATIONS

JP Application No. 2013518516 Office Action mailed Nov. 26, 2013, pp. 1-5.

CA Application No. 2804653 Office Action mailed Oct. 28, 2014, pp. 1-2.

CN Application No. 201180038954.6 Office Action mailed Nov. 18, 2014, pp. 1-5.

* cited by examiner

STABILIZER SYSTEM FOR A READY-TO-DRINK WHOLE GRAIN BEVERAGE

CROSS-REFERENCE TO RELATED APPLICATIONS

This application claims priority to U.S. Provisional Application No. 61/362,599, filed on Jul. 8, 2010, which is incorporated herein in its entirety.

FIELD OF THE INVENTION

The present invention relates generally to a stabilizer system for use in a ready-to-drink whole grain beverage. The stabilizer system includes carboxymethylcellulose, xanthan gum, and gellan gum.

BACKGROUND OF THE INVENTION

Whole grains are an important part of a balanced diet. Consumption of whole grains provide many health benefits including lowering the risk of chronic diseases such as diabetes and heart disease. Whole grains have also been found to promote weight management, lower cholesterol and may protect against cancer.

Because of the beneficial attributes of whole grains, there exists a need to incorporate whole grains into different food products in order to provide these benefits to consumers who, due to busy lifestyles, are not otherwise able to sit down to consume a bowl of cereal or oatmeal.

Prior attempts have been made to provide consumers with beverage products containing whole grains. However, such beverages provide substantial obstacles in that the grains tend to settle to the bottom of the beverage, separate, and retrograde, in addition to other unpalatable and unacceptable characteristics.

For the aforementioned reasons, a need exists for a stabilizer system for a whole grain beverage that is healthy and easy to drink on the go wherein the drink is shelf stable and the grain does not settle to the bottom of the beverage container.

BRIEF SUMMARY OF THE INVENTION

The present invention relates generally to a stabilizer system comprising carboxymethylcellulose, gellan gum, and xanthan gum for use in whole grain ready-to-drink beverages for preventing sedimentation of whole grain particles.

DETAILED DESCRIPTION OF THE INVENTION

The present invention relates to a stabilizer system for ready-to-drink whole grain beverages. In particular, this invention uses carboxymethylcellulose, xanthan gum, and gellan gum to suspend the grain particles in the beverage and prevent separation and retrogradation of the starch particles within the whole grain.

In particular, this application is directed to a stabilizer system comprising a blend of at least carboxymethylcellulose, xanthan gum, and gellan gum. This stabilizer system when used in a whole grain beverage prevents sedimentation of the grain particles and keeps them in suspension while preventing separation of the beverage and retrogradation of the starches in the whole grains. The blend described herein has much better suspension capacity than stabilizer blends currently on the market.

The carboxymethylcellulose (CMC) may be any suitable CMC, such as CMC purchased from Danisco USA. Similarly, the xanthan gum may be any suitable xanthan gum, such as xanthan gum purchased from CP Kelco. Lastly, the gellan gum may be any suitable gellan gum with maltodextrin, such as gellan gum purchased from CP Kelco. Unless otherwise indicated, all percentages (%) are by weight.

In one aspect of the present invention, the stabilizer system includes about 5 to 20% gellan gum, about 1 to 10% xanthan gum, and about 50 to 90% CMC. In another aspect, the stabilizer system includes about 10 to 15% gellan gum, about 10 to 15% xanthan gum, and about 70 to 80% CMC. More particularly, the stabilizer blend contains about 6.5% gellan gum, about 6.5% xanthan gum and about 87% CMC. All amounts based on total weight of the stabilizer system.

When used in a beverage, such as a whole grain beverage, the stabilizer system is present in an amount of from about 0.05 to 3% by final weight of the finished beverage. In another aspect, the stabilizer system is present in an amount of from about 0.02 to 0.4% by final weight of the finished beverage. For example, the beverage may include about 0.25-0.4% of the stabilizer system, such as about 0.4% of the stabilizer system.

In one aspect of the present invention, the stabilizer system is used in a juice-based beverage. In this aspect of the invention the stabilizer system comprises about 4 to 9% gellan gum, about 5 to 10% xanthan gum, and about 70 to 90% CMC. In a specific aspect, the system comprises about 87% CMC, about 6.5% xanthan gum and about 6.5% gellan gum. The juice-based beverage may contain about 0.01 to 0.05% gellan gum, about 0.01 to 0.05% CMC and about 0.1 to 0.5% xanthan gum. In one specific aspect, about 0.025% gellan gum, about 0.25% CMC and about 0.030% xanthan gum are included in the juice-based beverage. In addition about 0.01 to 8%, such as about 3.47% whole grain flour, and about 0.01 to 99% by weight juice base. The amount of the stabilizer system present in the finished beverage may be about 0.05% to about 3%, such as 0.4%.

Additional ingredients that may also be present in or otherwise added into the beverage include, without limitation, sweeteners, flavors, salts and water. Sweeteners that may be used in accordance with this invention include, without limitation, sucrose, fructose, glucose, maltose, erythritol, high fructose corn syrup, sucramalt, aspartame, Acesulfame K, lo hang guo, stevia, Reb A, agave, saccharin. Salts that may be used in accordance with this invention include, without limitation, sodium chloride, potassium chloride, sodium phosphate, disodium phosphate, potassium phosphate, dipotassium phosphate. Flavors that may be used in accordance with this invention include, without limitation, chocolate, vanilla, strawberry, malt, brown sugar, apple pomegranate, blueberry, raspberry, banana, mango, papaya, passion fruit, orange, grapefruit, cherry and coffee.

Moreover, the juice used in accordance with this invention may include, without limitation orange, apple, grape, pomegranate, raspberry, mango, strawberry, grapefruit and mixtures of these juices. Further, the whole grain used in accordance with this invention may include, without limitation, oats, wheat, rice, rye, barley, quinoa, amaranth, millet, corn and mixtures of these whole grains.

"Juice-based" or "juice base" as used herein shall mean any juice, including, without limitation, fruit, vegetable, and berry juices along with mixtures of these juices and concentrates. Examples of suitable juice bases for use in accordance with this invention include, without limitation: apple, grape, pomegranate, raspberry, mango, strawberry, grapefruit, orange, carrot, beet, spinach, cucumber, tomato and wheatgrass.

In another aspect of the present invention, the juice-based whole grain beverage containing the novel stabilizer system is made by weighing the sugar and gums separately and subsequently dry blending gums with sugar in a ratio of 1 to 10. In one aspect, the gums are blended with an equal amount of sugar. Next, the gum-sugar blend is added to room-temperature water with a high shear mixer operating at high speed for about five (5) minutes. Following mixing, the whole grains are then added to the gum-sugar mixture. Additional water is then added to the gum-sugar-whole grain mixture. Any remaining ingredients such as sucrose and salt are then added to the mixture. Next, the juice-base is added to the batch. Finally, the batch is standardized, the pH is set to about 2.0 to 8.0, such as 3.65, and any additional flavors are added.

In yet another aspect of the present invention, the stabilizer system is included in a milk-based whole grain beverage product. In this aspect of the invention the stabilizer system comprises about 5 to 20% gellan gum, about 1 to 10% xanthan gum, and about 50 to 90% CMC. In a specific aspect, the system comprises about 87% (by weight) CMC, about 6.5% (by weight) xanthan gum and about 6.5% (by weight) gellan gum. The milk-based beverage may contain about 0.01 to 0.05% gellan gum, about 0.1 to 0.5% CMC and about 0.01 to 0.03% xanthan gum. In one specific aspect, about 0.025% gellan gum, about 0.25% CMC and about 0.030% xanthan gum are included in the milk-based beverage. In addition, the beverage includes about 0.01 to 8%, such as about 3.47%, whole grain flour and about 0.01 to 99% by weight milk base. The amount of stabilizer system present in the finished beverage may be about 0.05% to about 3%, such as 0.4%.

Additional ingredients that may also be included in the beverage include, without limitation, sweeteners, flavors, salts and water. Sweeteners that may be used in accordance with this invention include, without limitation, sucrose, fructose, glucose, maltose, erythritol, high fructose corn syrup, sucramalt, aspartame, Acesulfame K, lo hang guo, stevia, Reb A, agave and saccharin. Salts that may be used in accordance with this invention include, without limitation, sodium chloride, potassium chloride, sodium phosphate, disodium phosphate, potassium phosphate, and dipotassium phosphate. Flavors that may be used in accordance with this invention include, without limitation, chocolate vanilla, strawberry, malt, brown sugar, apple, pomegranate, blueberry, raspberry, banana, mango, papaya, passion fruit, orange, grapefruit, cherry and coffee.

Further, the whole grain used in accordance with this invention may include, without limitation, oats, wheat, rice, rye, barley, quinoa, amaranth, millet, corn and mixtures of these whole grains.

"Milk-based" or "milk base" as used herein shall mean any protein-based food product, including, without limitation, condensed milk, skim milk, steamed milk, whole milk, powder skim milk, powder whole milk, 2% fat milk and 2% fat powder milk.

In another aspect of the present invention, the milk-based whole grain beverage containing the novel stabilizer system is made by weighing the sugar and gums separately and subsequently dry blending gums with sugar in a ratio of 1 to 10. In one aspect, the gums are blended with an equal amount of sugar. Next, the gum-sugar blend is added to room-temperature water with a high shear mixer operating at high speed. Following mixing for five (5) minutes, the whole grains are then added to the gum-sugar mixture. Additional water is then added to the gum-sugar-whole grain mixture. Any remaining ingredients such as sucrose and salt are then added to the mixture. Next, the milk-base is added to the batch. Finally, batch is subsequently standardized, the pH is set to about 2 to 8, such as about 7.0, and any additional flavors are added.

The inventors found that the stabilizer system described herein provides optimal suspension of the whole grains in the beverage while preventing separation and retrogradation of the starches in the whole grains. The suspension of the whole grain is very important in the beverage, since consumers are wary of purchasing a product with ingredients settled to the bottom of the serving container. Moreover by preventing separation of the beverage and retrogradation of the starches in the whole grains, the stabilizer system of the present invention also extends the shelf-life of a whole grain beverage containing this stabilizer system. For instance, beverages made with the stabilizer system of the present invention have an average shelf-life of about 12 months when stored at a temperature of about 25° C.

EXAMPLES

The following examples are specific aspects of the present invention and are not intended to limit it.

Example 1

A stabilizer blend was made using the following components:

| Ingredient |
| --- |
| Gellan gum |
| Carboxymethlcellulose |
| Xanthan gum |

The gum is dry blended with an equal amount of sugar. The gum may be dry blended in a V-blender or tri-blender.

Example 2

The stabilizer blend described in Example 1 was used in a juice-based whole grain beverage to make an orange-mango whole grain beverage with a shelf life of about 12 months:

| Ingredient | % |
| --- | --- |
| Orange Juice concentrate | 20.00% |
| Whole oats flour | 3.47% |
| Sucrose | 3.50% |
| Sodium chloride | 0.1% |
| Gellan gum | 0.025% |
| CMC | 0.25% |
| Xanthan gum | 0.030% |
| Water | 47.88% |

This beverage is made by weighing the sugar and gums separately and then dry blending the gums with an equal amount of sugar to create a gum-sugar blend. The gum-sugar blend is mixed with about 2200 g of room temperature water and mixed with a high shear mixer at high speed. After about 5 minutes, the oats are added to this mixture and blended under high shear. Subsequently, 5000 g of water is added to the gum-sugar-oat mixture. The remaining sucrose, milk and salt are then added, along with the orange juice concentrate. Next, the batch is standardized and the pH is set to about 7.0. Lastly, any flavors are added. This finalized batch is then packaged into bottles for distribution and sale to consumers. One serving size of the beverage is about 8 fl oz.

The stabilizer blend described herein was used in a milk-based whole grain beverage to make a milk-based whole grain beverage having a shelf life of about 12 months.

| Ingredient | % |
| --- | --- |
| Condensed Skim | 13.50% |
| Whole oats flour | 3.47% |
| Sucrose | 7.50% |
| Sodium chloride | 0.1% |
| Gellan gum | 0.025% |
| CMC | 0.25% |
| Xanthan gum | 0.030% |
| Water | 50.38% |

This beverage is made by weighing the sugar and gums separately and then dry blending the gums with an equal amount of sugar to create a gum-sugar blend. The gum-sugar blend is mixed with about 2200 g of room temperature water and mixed with a high shear mixer at high speed. After about 5 minutes, the oats are added to this mixture and blended under high shear. Subsequently, 5000 g of water is added to the gum-sugar-oat mixture along with the condensed skim milk. The remaining sucrose, milk and salt are then added, the batch is standardized and the pH is set to about 3.65. Lastly, any flavors are added. This finalized batch is then packaged into bottles for distribution and sale to consumers. One serving size of the beverage is about 8 fl oz.

The inventors of the present invention found that this combination of stabilizers in the concentrations was identified herein was not only challenging, but also provided unexpected results. For example, too much stabilizer will make the beverage too thick to drink and will cause overstabilization (gelation). On the other hand, too little stabilizer will cause separation of the beverage in two phases and precipitation of the grain. The stabilizer system of the present invention addresses both of these problems and provides a stabilizer system for use in whole grain beverages that increases the shelf life, while avoiding separation of the beverage and precipitation of the grain.

This invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:
1. A beverage comprising,
    about 0.01 to 8% by total weight of the beverage of whole grain flour wherein the whole grain flour consists of whole oat flour;
    0.01 to 99% by total weight of the beverage of a milk-based component selected from the group consisting of condensed milk, skim milk, steamed milk, whole milk, powder skim milk, powder whole milk, 2% fat milk, 2% powder milk and mixtures thereof; and
    a stabilizer system wherein the stabilizer system consists of a blend of about 0.01 to 0.05% xanthan gum, about 0.01 to 0.05% gellan gum and about 0.1 to 0.5% carboxymethylcellulose per total weight of the beverage, wherein the stabilizer system constitutes the only stabilizers present in the beverage;
    wherein the stabilizer system is present in an amount ranging from about 0.05% to about 3% by total weight of the beverage; and wherein the beverage has an average shelf life of about 12 months when stored at a temperature of about 25° C.

2. The beverage of claim 1 wherein the stabilizer system is present in an amount of about 0.4% by weight based on total weight of the beverage.

3. The beverage of claim 1 wherein the milk-based component is condensed skim milk.

4. The beverage of claim 1 further comprising sucrose and sodium chloride.

5. The beverage of claim 1 comprising about 0.025% gellan gum, about 0.25% carboxymethylcellulose and about 0.030% xanthan gum per total weight of the beverage.

6. A beverage comprising,
    about 0.01 to 8% by total weight of the beverage of whole grain flour wherein the whole grain flour consists of whole oat flour;
    0.01 to 99% by total weight of the beverage of a juice-based component; and
    a stabilizer system wherein the stabilizer system consists of a blend of about 0.01 to 0.5% xanthan gum, about 0.01 to 0.05% gellan gum and about 0.1 to 0.05% carboxymethylcellulose per total weight of the beverage, wherein the stabilizer system constitutes the only stabilizers present in the beverage;
    wherein the stabilizer system is present in an amount ranging from about 0.05% to about 3% by total weight of the beverage; and wherein the beverage has an average shelf life of about 12 months when stored at a temperature of about 25° C.

7. The beverage of claim 6 wherein the stabilizer system is present in an amount of about 0.4% by weight based on total weight of the beverage.

8. The beverage of claim 6 wherein the juice-based component is selected from the group consisting of apple, grape, pomegranate, raspberry, mango, strawberry, grapefruit, orange, carrot, beet, spinach, cucumber, tomato and mixtures thereof and is present in amount of about 1-99% by weight based on the total weight of the beverage.

9. The beverage of claim 6 further comprising sucrose and sodium chloride.

10. The beverage of claim 6 comprising about 0.025% gellan gum, about 0.25% carboxymethylcellulose and about 0.030% xanthan gum per total weight of the beverage.

* * * * *